US011463765B2

(12) United States Patent
Seo et al.

(10) Patent No.: US 11,463,765 B2
(45) Date of Patent: *Oct. 4, 2022

(54) MEDIA CHANNEL IDENTIFICATION AND ACTION WITH MULTI-MATCH DETECTION BASED ON REFERENCE STREAM COMPARISON

(71) Applicant: Roku, Inc., San Jose, CA (US)

(72) Inventors: Chung Won Seo, Seoul (KR); Youngmoo Kwon, Goyang (KR); Jaehyung Lee, Seoul (KR)

(73) Assignee: Roku, Inc., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/248,352

(22) Filed: Jan. 21, 2021

(65) Prior Publication Data

US 2021/0144435 A1 May 13, 2021

Related U.S. Application Data

(63) Continuation of application No. 15/929,193, filed on Dec. 19, 2019, now Pat. No. 10,939,162, which is a (Continued)

(51) Int. Cl.
*H04H 60/32* (2008.01)
*H04N 21/44* (2011.01)
(Continued)

(52) U.S. Cl.
CPC .......... *H04N 21/44008* (2013.01); *C09J 7/20* (2018.01); *E04F 13/0887* (2013.01);
(Continued)

(58) Field of Classification Search
CPC ....... H04N 21/44008; H04N 21/23109; H04N 21/23418; H04N 21/2353; H04N 21/2407;
(Continued)

(56) References Cited

U.S. PATENT DOCUMENTS 7,461,392 B2 12/2008 Herley
7,487,529 B1 2/2009 Orlick
(Continued)

FOREIGN PATENT DOCUMENTS

CN 101998100 3/2011
CN 102176208 9/2011
(Continued)

OTHER PUBLICATIONS

US 9,189,826 B1, 11/2015, Sharifi et al. (withdrawn)
(Continued)

*Primary Examiner* — Kyu Chae
(74) *Attorney, Agent, or Firm* — McDonnell Boehnen Hulbert & Berghoff LLP

(57) ABSTRACT

A computing system will compare various reference fingerprints each representing a reference media stream broadcast on a different respective known channel, and the computing system will determine that a plurality of the reference fingerprints match each other, thus defining a multi-match group of the matching reference fingerprints. Further, the computing system will determine that a query fingerprint representing a media stream being rendered by a media presentation device matches the multi-match group, thus raising a question of which channel is carrying the media stream that is being rendered by the media presentation device. By considering one or more attributes of the query fingerprint, the server may then disambiguate and thereby determine the channel at issue, and the server may in turn take channel-specific action.

20 Claims, 5 Drawing Sheets

Related U.S. Application Data continuation of application No. 16/246,746, filed on Jan. 14, 2019, now Pat. No. 10,575,052, which is a continuation of application No. 16/015,811, filed on Jun. 22, 2018, now Pat. No. 10,225,605, which is a continuation of application No. 15/443,580, filed on Feb. 27, 2017, now Pat. No. 10,104,426.

(60) Provisional application No. 62/301,616, filed on Feb. 29, 2016.

(51) Int. Cl.

| | | |
|---|---|---|
| *H04N 21/442* | (2011.01) | |
| *H04N 21/435* | (2011.01) | |
| *H04N 21/475* | (2011.01) | |
| *H04N 21/438* | (2011.01) | |
| *H04N 21/61* | (2011.01) | |
| *H04N 21/658* | (2011.01) | |
| *H04H 60/43* | (2008.01) | |
| *H04N 21/8352* | (2011.01) | |
| *H04N 21/231* | (2011.01) | |
| *H04H 60/31* | (2008.01) | |
| *C09J 7/20* | (2018.01) | |
| *E04F 13/08* | (2006.01) | |
| *E04F 15/02* | (2006.01) | |
| *H04N 21/234* | (2011.01) | |
| *H04N 21/235* | (2011.01) | |
| *H04N 21/24* | (2011.01) | |
| *H04N 21/258* | (2011.01) | |
| *H04N 21/6543* | (2011.01) | |
| *H04N 21/81* | (2011.01) | |
| *H04N 21/8358* | (2011.01) | |
| *H04N 21/431* | (2011.01) | |
| *H04N 21/84* | (2011.01) | |
| *H04N 21/845* | (2011.01) | |
| *H04H 60/56* | (2008.01) | |
| *H04H 60/65* | (2008.01) | |

(52) U.S. Cl.
CPC ....... *E04F 15/02155* (2013.01); *H04H 60/31* (2013.01); *H04H 60/43* (2013.01); *H04N 21/2353* (2013.01); *H04N 21/23109* (2013.01); *H04N 21/23418* (2013.01); *H04N 21/2407* (2013.01); *H04N 21/25841* (2013.01); *H04N 21/431* (2013.01); *H04N 21/435* (2013.01); *H04N 21/4383* (2013.01); *H04N 21/44204* (2013.01); *H04N 21/44222* (2013.01); *H04N 21/4756* (2013.01); *H04N 21/6118* (2013.01); *H04N 21/6543* (2013.01); *H04N 21/6582* (2013.01); *H04N 21/812* (2013.01); *H04N 21/8352* (2013.01); *H04N 21/8358* (2013.01); *H04N 21/84* (2013.01); *H04N 21/8456* (2013.01); *C09J 2203/314* (2013.01); *C09J 2301/124* (2020.08); *C09J 2301/21* (2020.08); *C09J 2301/314* (2020.08); *C09J 2433/00* (2013.01); *H04H 60/56* (2013.01); *H04H 60/65* (2013.01); *H04H 2201/90* (2013.01)

(58) Field of Classification Search
CPC .......... H04N 21/25841; H04N 21/431; H04N 21/435; H04N 21/4383; H04N 21/44204; H04N 21/44222; H04N 21/4756; H04N 21/6118; H04N 21/6543; H04N 21/6582; H04N 21/812; H04N 21/8352; H04N 21/8358; H04N 21/84; H04N 21/8456; C09J 7/20; C09J 2301/314; C09J 2301/124; C09J 2301/21; C09J 2203/314; C09J 2433/00; E04F 13/0887; E04F 15/02155; H04H 60/31; H04H 60/43; H04H 60/56; H04H 60/65; H04H 2201/90

See application file for complete search history.

(56) References Cited

U.S. PATENT DOCUMENTS

| | | | |
|---|---|---|---|
| 7,584,485 | B2 | 9/2009 | Yun et al. |
| 7,653,921 | B2 | 1/2010 | Herley |
| 7,788,696 | B2 | 8/2010 | Burges et al. |
| 7,797,249 | B2 | 9/2010 | Schmeizer et al. |
| 7,917,645 | B2 | 3/2011 | Ikezoye et al. |
| 8,150,096 | B2 | 4/2012 | Alattar |
| 8,185,733 | B2 | 5/2012 | Schwartz et al. |
| 8,499,316 | B2 | 7/2013 | Lincoln |
| 8,510,770 | B1 | 8/2013 | Oztaskent et al. |
| 8,649,659 | B2 | 2/2014 | Lalwaney |
| 8,700,194 | B2 | 4/2014 | Bauer et al. |
| 8,768,003 | B2 | 7/2014 | McMillan |
| 8,964,126 | B2 | 2/2015 | Harada et al. |
| 9,094,715 | B2 | 7/2015 | Neumeier et al. |
| 9,131,270 | B2 | 9/2015 | Falcon |
| 9,203,538 | B2 | 12/2015 | Anniballi et al. |
| 9,240,851 | B2 | 1/2016 | Park |
| 9,258,604 | B1 | 2/2016 | Bilobrov et al. |
| 9,412,330 | B2 | 8/2016 | Keating et al. |
| 9,465,995 | B2 | 10/2016 | Harron et al. |
| 9,609,391 | B2 | 3/2017 | Oztaskent et al. |
| 9,635,417 | B2 | 4/2017 | Grant et al. |
| 9,704,016 | B2 | 7/2017 | Jang et al. |
| 9,706,261 | B2 | 7/2017 | Chen |
| 9,906,843 | B2 | 2/2018 | Yabu et al. |
| 9,967,613 | B2 | 5/2018 | Kitazato |
| 9,986,306 | B2 | 5/2018 | Nagorski et al. |
| 9,992,527 | B2 | 6/2018 | An et al. |
| 10,104,426 | B2 * | 10/2018 | Seo ..................... E04F 13/0887 |
| 10,200,765 | B2 | 2/2019 | Yabu |
| 10,225,605 | B2 * | 3/2019 | Seo ..................... H04N 21/8456 |
| 10,231,023 | B2 | 3/2019 | Mallinson |
| 10,575,052 | B2 * | 2/2020 | Seo ..................... H04N 21/6543 |
| 10,939,162 | B2 * | 3/2021 | Seo ................. H04N 21/44008 |
| 2002/0083060 | A1 | 6/2002 | Wang et al. |
| 2003/0046437 | A1 | 3/2003 | Eytchison et al. |
| 2003/0063217 | A1 | 4/2003 | Smith |
| 2004/0143349 | A1 | 7/2004 | Roberts et al. |
| 2004/0189873 | A1 | 9/2004 | Konig et al. |
| 2005/0144455 | A1 | 6/2005 | Haitsma |
| 2005/0149968 | A1 | 7/2005 | Konig et al. |
| 2006/0062426 | A1 | 3/2006 | Levy et al. |
| 2006/0182412 | A1 | 8/2006 | Lefevre |
| 2007/0052802 | A1 | 3/2007 | Kasutani et al. |
| 2007/0055500 | A1 | 3/2007 | Bilobrov |
| 2007/0124756 | A1 | 5/2007 | Covell et al. |
| 2007/0143777 | A1 | 6/2007 | Wang |
| 2007/0192782 | A1 | 8/2007 | Ramaswamy |
| 2007/0217648 | A1 | 9/2007 | Muehlbauer |
| 2008/0060036 | A1 | 3/2008 | Cox |
| 2008/0082510 | A1 | 4/2008 | Wang et al. |
| 2010/0131970 | A1 | 5/2010 | Falcon |
| 2010/0293568 | A1 | 11/2010 | Jarman |
| 2010/0318587 | A1 * | 12/2010 | Seet ..................... G06F 16/217 |
| | | | 707/812 |
| 2010/0329547 | A1 | 12/2010 | Cavet |
| 2011/0075851 | A1 | 3/2011 | LeBoeuf et al. |
| 2011/0173208 | A1 | 7/2011 | Vogel |
| 2011/0273455 | A1 | 11/2011 | Powar et al. |
| 2011/0289098 | A1 | 11/2011 | Oztaskent et al. |
| 2011/0313856 | A1 | 12/2011 | Cohen et al. |
| 2012/0078894 | A1 | 3/2012 | Jiang et al. |
| 2012/0089911 | A1 | 4/2012 | Hosking et al. |
| 2012/0117584 | A1 | 5/2012 | Gordon |
| 2012/0167140 | A1 | 6/2012 | Park et al. |
| 2012/0239175 | A1 | 9/2012 | Mohajer et al. |
| 2013/0011008 | A1 | 1/2013 | Ikezoye et al. |
| 2013/0052939 | A1 | 2/2013 | Anniballi et al. |

(56) References Cited

U.S. PATENT DOCUMENTS

| | | |
|---|---|---|
| 2013/0054645 A1 | 2/2013 | Bhagavathy et al. |
| 2013/0081097 A1 | 3/2013 | Park et al. |
| 2013/0145414 A1 | 6/2013 | Yamagishi |
| 2013/0152139 A1 | 6/2013 | Davis et al. |
| 2013/0205330 A1 | 8/2013 | Sinha et al. |
| 2013/0212609 A1 | 8/2013 | Sinha et al. |
| 2013/0254793 A1 | 9/2013 | Anniballi et al. |
| 2013/0308818 A1 | 11/2013 | MacIntosh et al. |
| 2013/0326573 A1 | 12/2013 | Sharon et al. |
| 2013/0345840 A1 | 12/2013 | Lempel et al. |
| 2014/0007152 A1 | 1/2014 | Pora et al. |
| 2014/0013352 A1 | 1/2014 | Shavit et al. |
| 2014/0059587 A1 | 2/2014 | Davis et al. |
| 2014/0082655 A1 | 3/2014 | Moon et al. |
| 2014/0089307 A1 | 3/2014 | Garside et al. |
| 2014/0115627 A1 | 4/2014 | Lee et al. |
| 2014/0193027 A1* | 7/2014 | Scherf .................. G06F 16/783 382/100 |
| 2014/0195548 A1 | 7/2014 | Harron |
| 2014/0196077 A1 | 7/2014 | Gordon et al. |
| 2014/0236988 A1 | 8/2014 | Harron et al. |
| 2014/0282662 A1 | 9/2014 | Major |
| 2014/0282693 A1 | 9/2014 | Soundararajan et al. |
| 2014/0325555 A1 | 10/2014 | Khader et al. |
| 2014/0337874 A1 | 11/2014 | Kitazato |
| 2015/0020094 A1 | 1/2015 | Moon et al. |
| 2015/0033500 A1 | 2/2015 | Block et al. |
| 2015/0089526 A1 | 3/2015 | Gordon |
| 2015/0106839 A1 | 4/2015 | Shrum, Jr. et al. |
| 2015/0120839 A1 | 4/2015 | Kannan et al. |
| 2015/0181263 A1 | 6/2015 | Gordon et al. |
| 2015/0237409 A1 | 8/2015 | Harper et al. |
| 2015/0302086 A1 | 10/2015 | Roberts et al. |
| 2015/0365709 A1 | 12/2015 | Cho et al. |
| 2016/0094877 A1 | 3/2016 | Heffernan et al. |
| 2016/0127398 A1* | 5/2016 | Cohen ............... G06F 16/24578 726/23 |
| 2016/0275588 A1 | 9/2016 | Ye et al. |
| 2016/0316261 A1 | 10/2016 | Koshevoy |
| 2017/0048566 A1* | 2/2017 | Srinivasan ........... H04N 21/251 |
| 2017/0048596 A1 | 2/2017 | Fonseca, Jr. et al. |
| 2017/0308556 A1 | 10/2017 | Gonzales-Brenes, Jr. et al. |
| 2017/0330474 A1 | 11/2017 | Rho et al. |

FOREIGN PATENT DOCUMENTS

| | | |
|---|---|---|
| CN | 103226780 | 7/2013 |
| CN | 103501449 | 1/2014 |
| CN | 103533459 | 1/2014 |
| CN | 103581705 | 2/2014 |
| CN | 103634613 | 3/2014 |
| CN | 104598541 | 5/2015 |
| EP | 2 763 427 | 11/2011 |
| EP | 2 704 444 | 3/2014 |
| EP | 3 179 409 | 6/2017 |
| EP | 3 396 562 | 10/2018 |
| JP | 2001298433 | 10/2001 |
| JP | 2002245066 | 8/2002 |
| JP | 2011217144 | 10/2011 |
| JP | 2012156643 | 8/2012 |
| JP | 2014064179 | 4/2014 |
| JP | 2015008508 | 1/2015 |
| KR | 20130124911 | 11/2013 |
| WO | WO 2005/079499 | 9/2005 |
| WO | WO 2008/042953 | 4/2008 |
| WO | WO 2014/004914 | 1/2014 |

OTHER PUBLICATIONS

Office Action from U.S. Appl. No. 15/442,114, dated Dec. 14, 2017.
Office Action from U.S. Appl. No. 15/253,354, dated Jul. 10, 2017.
Office Action from U.S. Appl. No. 15/253,354, dated Nov. 1, 2017.
Office Action from U.S. Appl. No. 15/179,143, dated May 23, 2017.
Office Action from U.S. Appl. No. 15/179,143, dated Sep. 7, 2017.
Office Action from U.S. Appl. No. 15/222,405, dated Jul. 3, 2017.
Office Action from U.S. Appl. No. 15/222,405, dated Dec. 19, 2017.
Office Action from U.S. Appl. No. 15/343,895, dated Dec. 27, 2017.
Office Action from U.S. Appl. No. 15/443,615, dated Jan. 2, 2018.
Office Action from U.S. Appl. No. 15/842,206, dated Apr. 27, 2018.
Office Action from U.S. Appl. No. 15/842,189, dated May 15, 2018.
Office Action from U.S. Appl. No. 16/017,218, dated Sep. 28, 2018.
Office Action from U.S. Appl. No. 16/015,783, dated Sep. 28, 2018.
Office Action from U.S. Appl. No. 16/015,800, dated Oct. 9, 2018.
Office Action from U.S. Appl. No. 16/017,203, dated Sep. 28, 2018.
Office Action from U.S. Appl. No. 15/982,437, dated May 28, 2019.
Office Action from U.S. Appl. No. 16/017,190, dated Jun. 11, 2019.
Office Action from U.S. Appl. No. 16/274,966, dated Sep. 11, 2019.
Office Action from U.S. Appl. No. 16/274,975, dated Jun. 17, 2019.
Office Action from U.S. Appl. No. 16/276,061, dated Jun. 17, 2019.
Office Action from U.S. Appl. No. 16/015,827, dated Aug. 6, 2019.
Office Action from U.S. Appl. No. 15/929,179, dated Feb. 3, 2020.
International Preliminary Report on Patentability from International Application No. PCT/US2017/019979, dated Sep. 4, 2018.
"Feature topic: Answers to 100 Questions of Networks for WAN," Nikkei Network, No. 117 (January issue, 2010), Nikkei Business Publications, Inc. pp. 40-47, ISSN: 1345 to 482X.

* cited by examiner

MEDIA CHANNEL IDENTIFICATION AND ACTION WITH MULTI-MATCH DETECTION BASED ON REFERENCE STREAM COMPARISON

REFERENCE TO RELATED APPLICATIONS

This application is a continuation of U.S. patent application Ser. No. 15/929,193, filed Dec. 19, 2019, which is a continuation of U.S. patent application Ser. No. 16/246,746, filed Jan. 14, 2019, which issued as U.S. Pat. No. 10,575,052 and is a continuation of U.S. patent application Ser. No. 16/015,811, filed Jun. 22, 2018, which issued as U.S. Pat. No. 10,225,605 and is a continuation of U.S. patent application Ser. No. 15/443,580, filed Feb. 27, 2017, which issued as U.S. Pat. No. 10,104,426 and which claims priority to U.S. Provisional Patent Application No. 62/301,616, filed Feb. 29, 2016, the entirety of each of which is hereby incorporated by reference. In addition, the disclosures of the following applications are hereby incorporated herein by reference in their entirety: (i) U.S. Patent Application Pub. No. 2015/0181263, (ii) U.S. patent application Ser. No. 15/179,143, filed Jun. 10, 2016, (iii) U.S. patent application Ser. No. 15/222,405, filed Jul. 28, 2016, (iv) U.S. patent application Ser. No. 15/253,354, filed Aug. 31, 2016, and (v) U.S. patent application Ser. No. 15/343,895, filed Nov. 4, 2016.

BACKGROUND

A typical media presentation device operates to receive an analog or digital media stream representing media content such as video and/or audio content and to render and present the media content on a user interface such as a display screen and/or an audio speaker. Examples of such devices include, without limitation, televisions, computer monitors, projection systems, loudspeakers, headphones, and the like.

In many cases, such a media presentation device may be in communication with a receiver, such as a local set top box or other similar device or a remote server, that has access to numerous discrete channels of media content and that can selectively deliver a given such channel's media content to the media presentation device for playout.

By way of example, a television may be communicatively linked with a cable-TV set top box that has access to a set of cable-TV channels, and the set top box may be configured to receive user input selecting a particular channel and to responsively tune to the selected channel and output to the television the media content of the selected channel, for presentation of the media content to a user. As another example, a loudspeaker may be communicatively linked with a radio that has access to a set of radio stations, and the radio may be configured to receive user input selecting a particular channel (station) and to responsively tune to the selected channel and output to the loudspeaker the media content of the selected channel, for presentation of the media content to a user. And as still another example, a media presentation device such as a display or speaker may be communicatively linked with a computer that has access to a myriad of online streaming media channels, and the computer may be configured to receive user input selecting a particular channel and to responsively initiate receipt and output of the selected media content and provide the media content to the display and/or speaker for presentation to a user.

SUMMARY

When a media presentation device receives and renders media content, the media presentation device may not have an indication of which channel carried the media content. A receiver or other device that selectively tunes to the channel and receives the media content and that provides the media content to the media presentation device may have such information, but the media presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

For various reasons, however, it may be useful to determine which of various channels is the channel that carries the content being rendered by a media presentation device. Further, it may be useful to do so without receiving from a channel-selection device (e.g., receiver or remote control) a report of the channel to which that device is tuned, and perhaps without any involvement of the channel-selection device. For instance, it may be useful for the media presentation device itself, and/or a network server working in cooperation with the media presentation device, to determine the channel based on an evaluation of the media content that is being rendered by the media presentation device. Given knowledge of the channel on which the media content is arriving, the media presentation device, the network server, and/or another entity could then carry out one or more operations keyed to the channel, such as determining and recording an extent to which media content of that channel is being played, selectively replacing a predetermined portion of the media content with alternative content (such as a replacement advertisement), or superimposing channel-specific content over the media content for presentation along with the media content, among numerous other possibilities.

One method to determine the channel on which media content is arriving is to have the media presentation device (or perhaps an adjunct device) and/or a network server generate a digital fingerprint of the media content that is being rendered by the media presentation device, and to then compare that fingerprint with reference fingerprint data established for media content known to be provided on particular channels.

For example, a network server or other such entity may establish or otherwise have access to reference data that includes a reference fingerprint of a media stream being broadcast respectively on each of various available channels and that maps each reference fingerprint to the channel on which the represented media stream is being broadcast. As the media presentation device receives and renders media stream on a given channel, the media presentation device may then generate a fingerprint of that media stream and, through a network communication interface, report the generated fingerprint as a query fingerprint to the network server for analysis.

The network server may then compare the reported query fingerprint with the reference fingerprint data to find a match with a reference fingerprint and to thereby determine that the channel on which the media content being rendered by the media presentation device is arriving is the channel that the reference data maps with that reference fingerprint. Upon thereby determining the channel on which the media content is arriving, the network server may then communicate an indication of the channel to the media presentation device, and the media presentation device may take channel-specific action. Alternatively, the network server itself or another entity may take channel-specific action based on the determined channel.

Unfortunately, however, a problem that can arise in this process is that the same media content may be broadcast on multiple different channels, whether concurrently or at different times, and so a query fingerprint of media content being rendered by a media presentation device may not correlate with just the channel on which the media content is arriving. For example, a sports game or political event might be broadcast concurrently on multiple different channels, or a syndicated television or radio show might be broadcast on multiple different such channels concurrently or at different times. In these or other scenarios, if the media presentation device is presenting such media content and generates and provides a query fingerprint of the media content, that query fingerprint could be matched with multiple reference fingerprints, and consequently the channel-identification would be inconclusive.

As a specific example of this, consider a scenario where two different video content providers both broadcast the same sports game, each on a separate respective channel, and where an advertiser has a contract with just one of the content providers to present a pop-up advertisement on that provider's broadcast of the game. In this scenario, when a media presentation device is receiving and presenting one of these broadcasts, if the media presentation device generates and provides to the network server a query fingerprint of the broadcast, the network server may determine that the query fingerprint matches both content providers' broadcasts of the game, and so it would be unclear whether the media presentation device should present the pop-up advertisement or not.

Disclosed herein are methods and systems to help disambiguate channel identification in a scenario where fingerprint data of media content matches multiple reference fingerprints corresponding respectively with multiple different channels.

In accordance with the disclosure, a computing system will compare various reference fingerprints each representing a reference media stream broadcast on a different respective known channel, and the computing system will determine that a plurality of the reference fingerprints match each other, thus defining a multi-match group of the matching reference fingerprints. Further, the computing system will determine that a query fingerprint representing a media stream being rendered by a media presentation device matches the multi-match group, thus raising a question of which channel is carrying the media stream that is being rendered by the media presentation device.

To resolve this question, according to the disclosure, the computing system will take into account one or more attributes of the query fingerprint as a basis to determine which reference fingerprint of the multi-match group best matches the query fingerprint, thus establishing that the channel on which the reference media stream represented by the determined reference fingerprint is broadcast is the channel on which the query media stream being rendered by the media presentation device is arriving.

In this process, the one or more attributes of the query fingerprint stream that the computing system considers as a basis to determine which reference fingerprint of the multi-match group best matches the query fingerprint could take various forms.

As an example, the one or more attributes could include a geographic location (e.g., a designated market area (DMA)) in which the media presentation device that provided the query fingerprint is located. For instance, if each of the reference fingerprints in the multi-match group represents a reference media stream broadcast in a respective geographic location (e.g., a respective DMA), then the location of the media presentation device could help resolve the multi-match by identifying a proper subset of the members of the multi-match group having that same associated location.

And as another example, the one or more attributes could include an identity of a media content distributor (e.g., cable-TV provider, satellite-TV provider, etc.) that provides media content for rendering by the media presentation device. For instance, if each of the reference fingerprints in the multi-match group represents a reference media stream broadcast by a respective media content distributor, then the identity of the media content distributor that provides media content for rendering by the media presentation device could help resolve the multi-match by identifying a proper subset of the members of the multi-match group having that same associated service provider. Other examples are possible as well.

Accordingly, in one respect, disclosed is a method for taking action based on channel identification, with multi-match detection based on reference stream comparison. In accordance with the method, a computing system obtains reference fingerprints that represent reference media streams broadcast on channels, where each reference fingerprint represents a respective one of the reference media streams, and where each reference media stream is broadcast on a respective channel. And the computing system detects, based on a comparison of the reference fingerprints with each other, that a plurality of the reference fingerprints match each other, the plurality of reference fingerprints defining a multi-match group.

Further, the computing system determines that a query fingerprint representing a media stream being rendered by a media presentation device matches the multi-match group. And responsive to that determination, the computing system then uses one or more attributes of the received query fingerprint as a basis to determine which reference fingerprint of the multi-match group best matches the query fingerprint and to determine that the channel on which the reference media stream represented by the determined reference fingerprint is broadcast is the channel on which the media stream being rendered by the media presentation device is being broadcast, i.e., the channel carrying the media stream being rendered by the media presentation device. The computing system then takes action based on the determined channel, such as causing supplemental channel-specific content to be presented by the media presentation device for instance.

Additionally disclosed is a computing system configured to carry out operations such as these. As disclosed, the computing system could include a network communication interface and could include a controller comprising a processing unit, data storage, and program instructions stored in the data storage and executable by the processing unit to carry out the operations. The computing system could include or be in communication with a plurality of media-receiver devices configured to receive the reference media streams on known channels and to provide the reference fingerprints representing those reference media streams. Thus, in practice, the computing system could compare the reference fingerprints generated by the media-receiver devices and thereby detect the multi-match group. Further, the computing system could determine that a query fingerprint representing a media stream being rendered by a media presentation device matches the multi-match group, and the computing system could then consider one or more attributes of the query fingerprint as a basis to disambiguate and thereby determine the channel on which the media stream being rendered by the media presentation device is being broadcast.

Still further, disclosed is a non-transitory computer readable medium having stored thereon instructions executable by a processing unit to carry out operations such as those noted above.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
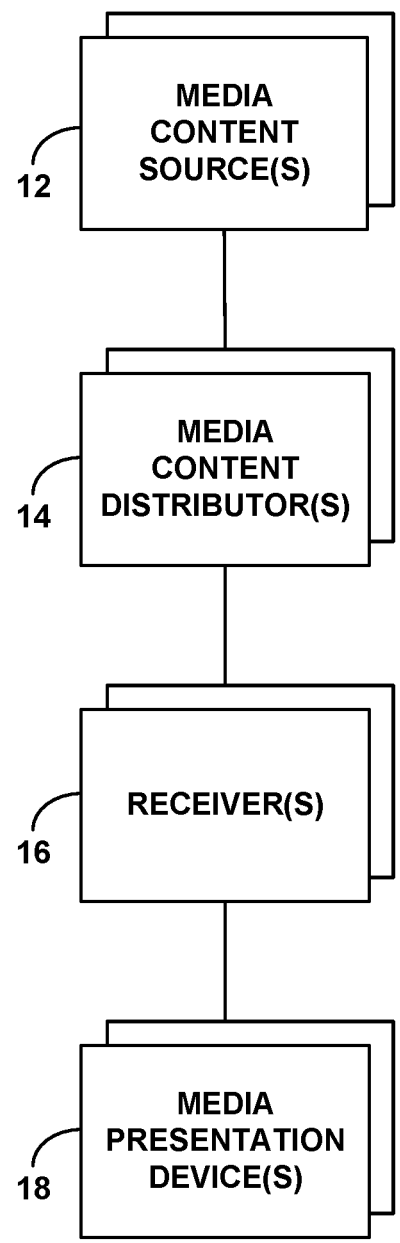
FIG. 1 is a simplified block diagram of an example system in which various disclosed principles can be applied.

Referring to the drawings, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 12 (e.g., broadcasters, web servers, etc.), one or more media content distributors 14 (e.g., multi-channel distributors, such as cable providers, satellite providers, over-the-air broadcast providers, web aggregators, etc.), one or more media content receivers 16 (e.g., cable receivers, satellite receivers, over-the-air broadcast receivers, computers or other streaming media receivers, etc.), and one or more clients or media presentation devices 18 (e.g., televisions or other display devices, loudspeakers or other audio output devices, etc.)

In practice, for instance, the media content sources 12 could be national broadcasters, such as ABC, NBC, CBS, FOX, HBO, and CNN, the media content distributors 14 could be local affiliates and/or other local content distributors in particular designated market areas (DMAs), and the receivers 16 and media presentation devices 18 could then be situated at customer premises, such as homes or business establishments. With this or other arrangements, the content sources 12 could deliver media content to the content distributors 14 for distribution to receivers 16 at customer premises, and the content distributors could distribute the media content to the receivers 16 on discrete channels (e.g., particular frequencies). Each receiver could then respond to user input or one or more other triggers by tuning to a selected channel and outputting to a media presentation device 18 the media content that is arriving on the selected channel. And the media presentation device 18 could receive and render the media content (e.g., display or otherwise present the content).

In this arrangement, as the media presentation device receives and renders this media content, the media presentation device may have no indication of the channel on which the media content is arriving, i.e., of the channel to which the receiver is tuned. Rather, the media presentation device may be configured simply to receive the media content as a media stream from the receiver and to render the received media content. Per the present disclosure, however, the media presentation device may be in communication with a network server and may work with the network server to facilitate identification of the channel and thus to facilitate taking useful channel-specific action.

Figure 2:
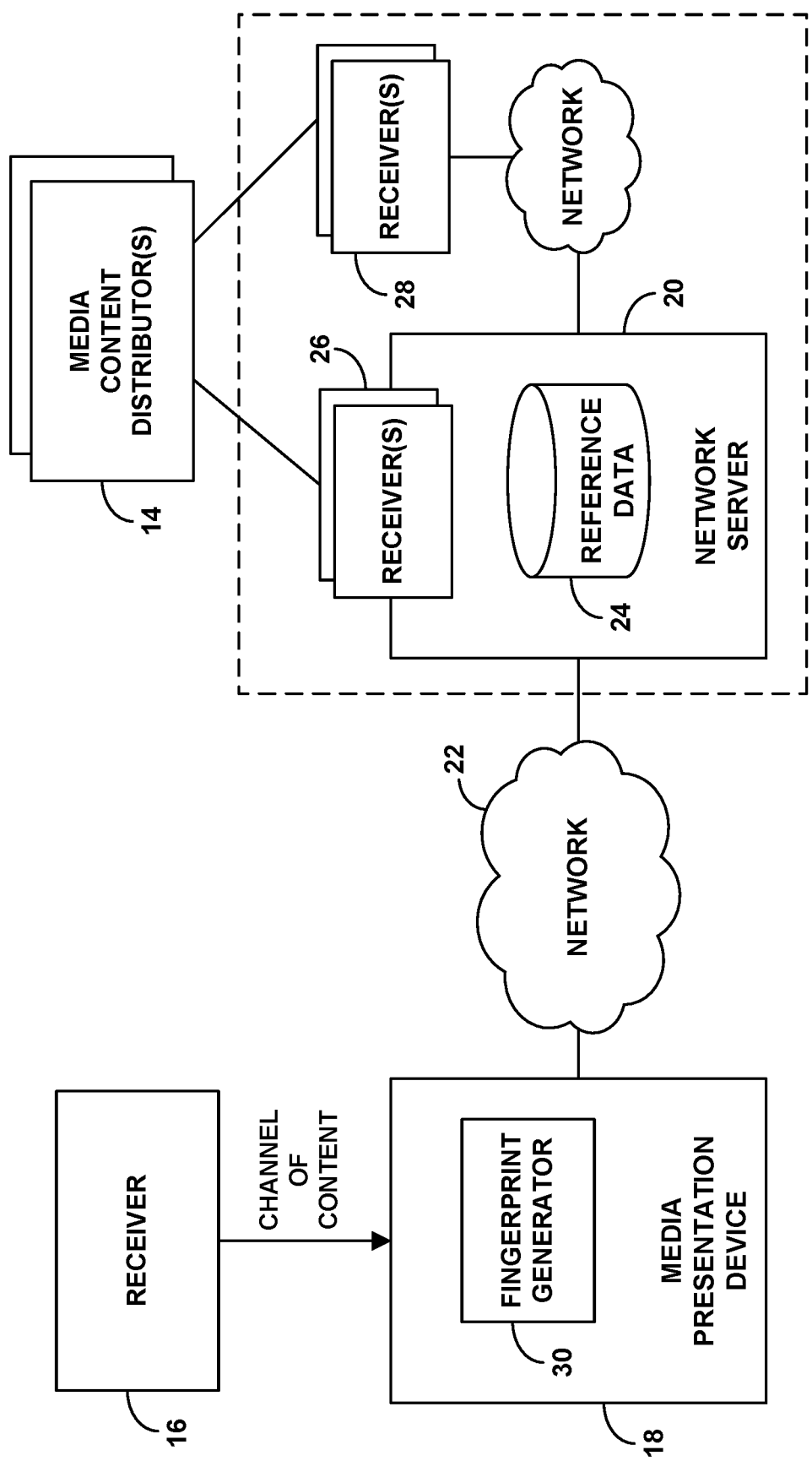
FIG. 2 is a simplified block diagram of an example network arrangement in which a media presentation device communicates with a network server to facilitate implementing various disclosed principles.

FIG. 2 illustrates an example network arrangement in which a media presentation device 18 is in communication with a network server 20 via a network 22, such as the Internet. In practice, the media presentation device 18 may sit as a node on a local area network (LAN) at customer premises, with the media presentation device having an assigned Internet Protocol (IP) address on the LAN and the LAN having an IP address on the Internet. Further, the network server 20 may also be accessible at an IP address on the Internet. With this arrangement, the media presentation device may initiate and engage in IP communication with the network server via the Internet, to report a fingerprint of media content being rendered by the media presentation device, so as to facilitate channel identification and associated action.

As discussed above, the network server 20 or another entity operating in accordance with the present disclosure could establish or have access to reference data 24 for media streams that are carried or scheduled to be carried on at least each of various channels accessible to the media presentation device 18. The reference data, which could be stored in a relational database or other form, could include reference fingerprints that represent media streams of various channels, with each reference fingerprint representing a respective reference media stream, and each reference media stream being broadcast on a respective known channel.

In practice, for instance, some or all of the reference fingerprints could represent reference media streams that are currently being broadcast on respective channels. For example, each such reference fingerprint could be a reference fingerprint stream representing a most recent period of time (e.g., on a sliding window basis) of a respective reference media stream that is currently being broadcast on a respective channel. Alternatively or additionally, some or all of the reference fingerprints could be a reference fingerprint (e.g., reference fingerprint stream) of media content programs (e.g., television broadcasts, radio broadcasts, streaming media files, etc.) defining media streams that are available or scheduled to be carried on particular respective channels. As such, the reference data could map each reference fingerprint to a channel on which the associated reference media stream (i.e., the media content uniquely identified by the reference fingerprint) is being broadcast or is scheduled to be broadcast.

In mapping reference fingerprints to channels, the reference data could characterize the channels by various attributes, to help distinguish the channels from each other. For example, where a receiver or other such device provides multiple different channels that are user-selectable by channel number, the reference data could characterize the channels by their respective channel numbers. And as another example, where each channel carries a particular content source's content, such as the content of one of a particular broadcaster for instance, the reference data could characterize the channels by their respective content sources' identities. Still further, where more than one content distributor (e.g., multichannel distributor) distribute content sources' content, the reference data could characterize the channels by their respective content distributors' identities. And for channels that are broadcast in particular geographic locations, such as a particular DMAs, the reference data could characterize the channels by their broadcast locations. In practice, the reference data could correlate each reference fingerprint with one or more of these or other attributes.

The network server 20 or other entity operating in accordance with the present disclosure could establish or obtain some or all of this reference data by analyzing media content arriving on each of the various channels (e.g., at least the media stream arriving respectively on each of various channels that are available to a receiver that serves the media presentation device). To facilitate this, as shown, the server could include or be interconnected with one or more media receiver devices 26 that are configured to receive media streams from one or more of the media content distributors 14 on various channels in much the same way that receivers would be configured to receive content at customer premises. For instance, the server could include or be interconnected with one or more cable-TV set top boxes, radios, computers, or other media receivers, or could be configured to emulate one or more such receivers. The server could then be configured to receive and analyze the respective media stream arriving on each channel and to generate for each channel a respective reference fingerprint of the channel's media content, using any media fingerprinting process now known or later developed (e.g., computing a hash on a per frame or other basis, or otherwise identifying, extracting and digitally representing component features unique to the media content).

The server could be configured to receive concurrently on multiple such channels (perhaps all of the channels) and to analyze and generate respective fingerprints for the channels in parallel, or the server might be configured to hop from channel to channel, possibly repeatedly cycling through the channels, to analyze and generate a respective fingerprint for each channel. Further, the server could continue to do this in real-time, saving a respective fingerprint of a most recent time window of media content for each channel, for reference. And the server could record each channel's reference fingerprint in the reference data in association with a characterization of the channel (e.g., with attributes such as those noted above) and timestamp information indicating a time of receipt of the associated media stream. Here, the server would have knowledge of each channel (e.g., channel number), just as a receiver would normally have knowledge of the channel to which the receiver is tuned. Further, the server may have access to guide information or other such data specifying attributes of each such channel (e.g., content source identity, content distributor identity, location, etc.), so that the server can determine and record channel attributes respectively for each reference fingerprint.

Alternatively or additionally, the server could receive such reference fingerprints from external media receiver devices 28, such as from media receiver devices located in various respective DMAs. This implementation could be especially useful for channels that are provided only in specific DMAs. In this implementation, each media receiver device 28, perhaps interworking with an associated computer server, could be configured to receive and analyze the respective media stream arriving on each channel available to the media receiver device, to generate for each such channel a reference fingerprint (e.g., reference fingerprint stream) of the channel's media stream using any fingerprint process now known or later developed, and to provide the reference fingerprint (e.g., periodically or continuously) via a network connection to the server 20. Further, the media receiver device 28 could provide server 20 with information characterizing the channel on which the media stream represented respectively by each such reference fingerprint is arriving, such as the channel number and other attributes noted above. And the server could thus record each receive fingerprint along with its associated channel attributes.

Still alternatively or additionally, the server could also receive or perhaps establish reference fingerprints for media content programs that are available or scheduled to be provided on particular channels. For instance, providers or distributors of various media content programs could generate reference fingerprints for the media content programs (defining media streams), again using any media fingerprinting process now known or later developed, and those reference fingerprints could be provided to the server. Alternatively, the server could receive advance copies of the media content programs and could itself generate such reference fingerprints. Further, the server could receive or determine from program guide information the channel on which the media content program is available or scheduled to be provided, and perhaps a day and time at which the media content is scheduled to be provided. The server could then record each media content program's reference fingerprint in the reference data in association with the channel on which the media content program is available or scheduled to be carried, likewise with associated channel attributes, and perhaps in association with a day and time at which the media content program is scheduled to be provided.

Given this or other such reference data, when the server is presented with a query fingerprint of a media stream that was received on an unknown channel, the server could match the query fingerprint with one of the stored reference fingerprints, using any fingerprint matching process now known or later developed, and could thereby conclude that the media stream at issue arrived on the channel that the reference data maps to the matching reference fingerprint. Thus, if the server is faced with a query fingerprint of a media stream that is being rendered by the media presentation device 18, the server could compare the query fingerprint with the reference fingerprints in the reference data. And if the server thereby finds a matching reference fingerprint, then the server could identify the channel that the reference data maps with the matching reference fingerprint and could conclude that that is the channel on which the media presentation device is receiving the media stream (i.e., that that is the channel carrying the media content being rendered by the media presentation device). In turn, the server could responsively take a channel-specific action based on the identified channel, or cause or enable one or more other entities to take a channel-specific action based on the identified channel.

To facilitate this, the media presentation device 18 or another entity could be configured to generate a query fingerprint of the media stream that is being rendered by the media presentation device and to transmit the query fingerprint to server 20 for analysis.

For instance, as shown in FIG. 2, the media presentation device could include a fingerprint generator 30, which could be configured to generate a digital fingerprint of the media stream being rendered by the media presentation device. Such a fingerprint generator could be configured to generate the fingerprint of the media stream as the media presentation device is receiving the media stream on a channel from a receiver 16 and/or as the media presentation device is processing the media stream for presentation. As such, the fingerprint generator could receive as input a copy of the media stream arriving at the media presentation device from the receiver and/or being processed for presentation by the media presentation device, and to apply any media fingerprinting process now known or later developed to generate a fingerprint of the media stream.

In practice, the fingerprint generator could be configured to generate such a fingerprint as a fingerprint stream on an ongoing basis, such as on a per frame basis (e.g., per key-frame basis) or other basis. And the media presentation device could be configured to transmit the fingerprint as a query fingerprint via network 22 to a server 20 for analysis. By way of example, the media presentation device could be configured to periodically or from time to time transmit to the server a query fingerprint representing a latest frame, series of frames or other portion of the media stream being rendered by the media presentation device. In particular, the media presentation device could generate a message carrying the latest generated query fingerprint, along with one or more timestamps and/or other such data as well as an identifier of the media presentation device, and could transmit the message to the server's IP address. And the server could thereby receive the query fingerprint for analysis.

Alternatively, the media presentation device could transmit to the server, and the server could thus receive, various data regarding the media stream being rendered by the media presentation device, likewise on an ongoing basis or other basis, to enable the server itself or another entity to generate a fingerprint of the media stream being rendered by the media presentation device. For example, the media presentation device could transmit to the server portions of the media stream being rendered by the media presentation device, such as individual frames (e.g., snapshots) or other segments of the media stream. And the server could generate a fingerprint of that media content for analysis.

Through the process described above, the server could then compare the fingerprint of the media stream being rendered by the media presentation device with the reference fingerprints in the reference data, using any digital fingerprint comparison process now known or later developed. And as noted above, if the server thereby finds a matching reference fingerprint, the server could determine the channel that the reference data maps with the matching reference fingerprint and could conclude that the determined channel is the channel carrying the media stream being rendered by the media presentation device.

In response to thereby determining the channel at issue, the server could then take, or cause to be taken, one or more channel-specific actions based on the determination of the channel. In particular, the server itself could take action based on the channel determination, or the server could signal to another entity, perhaps to the media presentation device, to cause the other entity to take action based on the channel determination.

For example, the server could record the fact that the media presentation device is presenting content of that particular channel, as part of a channel rating or analytics system to measure the extent to which particular channels are being presented by media presentation devices. For instance, the media presentation device could regularly (e.g., periodically) report to the server a fingerprint of the media stream that the media presentation device is rendering, and the server could carry out processes such as those discussed herein to determine the channel being rendered. Each time the server thus determines that a channel is being rendered, the server could add to a count or other statistic of the channel being rendered, as data to indicate the extent to which that channel is being presented.

As another example, the server could responsively cause the media presentation device to present supplemental content, such as a pop-up advertisement as discussed above, a commercial break, or a channel identification, among other possibilities, possibly as a replacement for one or more portions of the media stream being rendered by the media presentation device. For instance, given knowledge of the channel at issue, the server could generate or select (e.g., from server data storage) particular supplemental media content associated specifically with the determined channel and could transmit the supplemental media content to the media presentation device for the media presentation device to present in conjunction with the media stream that the media presentation device is receiving from the receiver. The media presentation device could thus receive the supplemental media content from the server and present it in conjunction with the media stream that the media presentation device is receiving from the receiver.

In practice, this process could involve the server receiving in real-time from the media presentation device a fingerprint of the media stream being rendered by the media presentation device and the server determining that the received fingerprint matches a reference fingerprint of a media stream that is being broadcast, or is scheduled for current broadcast, on a known channel.

Note that, in some cases, there may be a time difference between when the media presentation device renders media content and timestamps and transmits the fingerprint to the server and when the server receives the media content on the known channel and otherwise has the reference fingerprint timestamped. The server could account for this time difference by comparing the received fingerprint over a sliding window of the reference fingerprint or vice versa. Further, the server could account for this time difference when taking action in response to a determined match between the received fingerprint and the reference fingerprint. For example, if the media presentation device receives the media content sufficiently earlier than the server's timestamp for the content (e.g., more than a few seconds earlier), the server could still identify a fingerprint match and could record analytics data. But in response to detecting that time difference, the server might forgo having the media presentation device present associated supplemental content, to help avoid a situation where the media presentation device presents the supplemental content too late (e.g., is out of sync) from a user's perspective. On the other hand, if the server detects a fingerprint match for a sufficient period of time and/or determines that the matching content will continue, the server may have the media presentation device present supplemental content even when faced with such a time difference.

In any event, through these or other such processes, a network server or other entity can determine the channel on which the media presentation device is receiving the media content at issue. And once the entity determines the channel, the entity may then take action based on the channel determination. Alternatively, the entity could signal to another entity, perhaps back to the media presentation device, to cause the other entity to take action based on the channel determination. Other examples are possible as well.

In line with the discussion above, the server 20 or other entity that has access to reference data as noted above could be configured to identify multi-match scenarios, by detecting among the reference data various reference fingerprints that match each other.

In one implementation, for instance, the server could regularly analyze the reference data in search of multi-match scenarios, comparing pairs of reference fingerprints in the reference data using any now known or later developed media fingerprint matching process, in an effort to find reference fingerprints that match each other. Upon finding each such match of at least two of the reference fingerprints, the server could then flag the reference fingerprints as being a multi-match group. Such a flag could indicate that there will be a potential ambiguity if the fingerprint of media stream being rendered by the media presentation device matches any of the reference fingerprints in the flagged multi-match group. The server could flag the reference fingerprints as being a multi-match group in various ways. For instance, the server could cross-reference the reference fingerprints of the multi-match group in the reference data, to indicate that they are members of a multi-match group. Alternatively, the server could store a single copy of the reference fingerprint and associate that copy with various channels on which the media content represented by the reference fingerprint is carried.

With this implementation, when the server receives from a media presentation device a query fingerprint representing a media stream being rendered by the media presentation device and the server determines that the query fingerprint matches a reference fingerprint, the server could then readily determine from the reference data whether a multi-match situation exists. If the matching reference fingerprint is not flagged or otherwise indicated as being a member of a multi-match group, then the server could conclude that a single-match situation (rather than a multi-match situation) exists, in which case, as discussed above, the server could then readily determine from the reference data the channel associated with the matching reference fingerprint and could conclude that that is the channel carrying the media stream being rendered by the media presentation device. Whereas, if the matching reference fingerprint is flagged as being a member of a multi-match group, then the server could conclude that a multi-match situation (rather than a single-match situation) exists, in which case the server may need to perform a disambiguation process to help identify the channel at issue from among those associated with the reference fingerprints of the multi-match group.

Note that the process of detecting a multi-match situation involving two or more reference fingerprints could be performed even if the two reference fingerprints represent the same media stream carried on two different channels at a time delay relative to one another, i.e., where the presentation of the media content on one of the channels is time shifted in relation to presentation of the same media content on another one of the channels. The fingerprint matching process could account for this time shifting and could still find a match if the fingerprints otherwise match each other, such as by comparing one fingerprint over a sliding window with the other fingerprint. For instance, the process of finding matching reference fingerprints within the reference data could involve searching for reference fingerprints that match one another and are presented and/or scheduled at respective times that are within a threshold time interval of each other.

By way of example, consider a scenario where largely the same media stream is being presented on two channels for which the server or an external entity establishes respective reference fingerprints representing each channel's media stream, but where the media stream on one channel is slightly earlier in time than the media stream on the other channel. In that case, a first of the reference fingerprints could be considered an earlier or faster reference fingerprint representing the first media stream, and the second reference fingerprint could be considered a later or slower reference fingerprint representing the second media stream. Notwithstanding the slight time shift between these reference fingerprints, the server could still find that the reference fingerprints match each other, such as by comparing them over a sliding window or otherwise accounting for the slight time shift between them, and the server could flag or tag both of the reference fingerprints as being in a multi-match group with each other. Consequently, if the server then receives a query fingerprint representing media content being rendered by the media presentation device and determines that the query fingerprint matches the earlier reference fingerprint, the server could essentially predict that a multi-match situation exists, even if the server has not yet detected that the query fingerprint matches the later reference fingerprint.

As noted above, when the server or other entity carrying out this analysis detects that the fingerprint of the media content being rendered by the media presentation device matches multiple reference fingerprints corresponding with multiple channels, the entity could apply a disambiguation process based on consideration of one or more attributes of the query fingerprint, to determine which reference fingerprint of the multi-match group best matches the query fingerprint. Here, the one or more attributes of the query fingerprint could be any context information associated with the query fingerprint.

By way of example, as noted above, the one or more attributes could include a geographic location (e.g., DMA) in which the media presentation device that provided the query fingerprint is located and/or an identity of the a media content distributor (e.g., cable-TV provider, satellite-TV provider, etc.) that provides media content for rendering by the media presentation device. For instance, as noted above, if each of the reference fingerprints in the multi-match group represents a reference media stream broadcast in a respective geographic location (e.g., a respective DMA), then the location of the media presentation device could help resolve the multi-match by identifying a proper subset of the members of the multi-match group having that same associated location. And as further noted above, if each of the reference fingerprints in the multi-match group represents a reference media stream broadcast by a respective media content distributor, then the identity of the media content distributor that provides media content for rendering by the media presentation device could help resolve the multi-match by identifying a proper subset of the members of the multi-match group having that same associated service provider.

In practice, the server could determine these or other such attributes of the query fingerprint through communication with the media presentation device and/or through evaluation of the query fingerprint, as described by one or more the applications incorporated herein by reference. By way of example, when the media presentation device transmits the query fingerprint to the server, the media presentation device could provide the server with an indication of the media presentation device's location and/or associated media content distributor. As another example, the server could determine the media presentation device's location based on evaluation of the media presentation device's IP address. And as another example, the server could determine that the query fingerprint contains one or more components that are specific to a particular location and/or media content distributor. Other examples are possible as well.

Through this process, the server could thus determine which reference fingerprint in the multi-match group best matches the query fingerprint, and the server could determine from the reference data the channel associated with that matching reference fingerprint and could conclude that that is the channel carrying the media stream being rendered by the media presentation device. And in turn, the server could then take channel-specific action, such as causing the media presentation device to present supplemental channel-specific content, recording presentation of the identified channel, or the like.

Note that while the forgoing discussion focuses primarily on server 20 identifying a multi-match situation and then disambiguating based on consideration of context, some or all of the operations described could alternatively be carried out by one or more other entities, in place of or in cooperation with the server.

For instance, one or more of the operations could be carried out by the media presentation device itself or by an adjunct system in local communication with the media presentation device. By way of example, the media presentation device itself could be provisioned with or have access to reference data like that described above, and the media presentation device could itself refer to the reference data to identify a multi-match situation, to disambiguate, and to identify the channel that provides the media content being rendered by the media presentation device. Further, the media presentation device could then itself take channel-specific action, such as presenting channel-specific content, recording channel presentation, or the like, or could cause one or more other entities to take such action. Other variations are possible as well.

Figure 3:
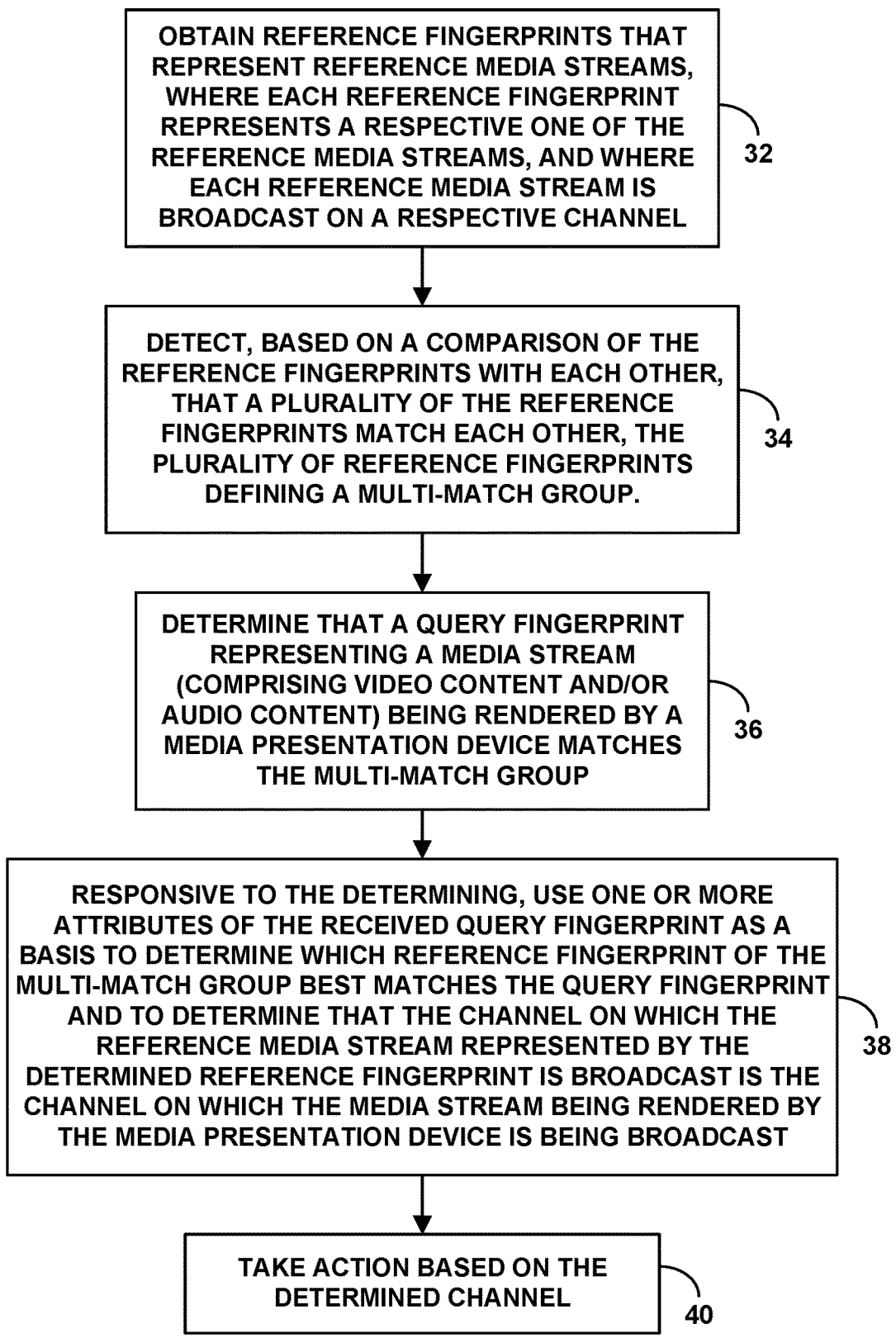
FIG. 3 is a flow chart depicting operations that can be carried out in accordance with the present disclosure.

FIG. 3 is next a flow chart depicting a method that can be carried out in line with the discussion above. One or more of the operations in the method depicted by FIG. 3 could be carried out by a computing system, which could include a network server, a media presentation device, and/or one or more entities operating on behalf of or in cooperation with these or other entities. Such a computing system could include a programmed processing unit or the like, configured to carry out one or more of the method operations. Further, a non-transitory computer readable medium (e.g., disc storage, flash storage, or the like) could have stored thereon instructions executable by a processing unit to carry out the various depicted operations.

As shown in FIG. 3, at block 32, the method includes the computing system obtaining reference fingerprints that represent reference media streams (comprising video content and/or audio content), where each reference fingerprint represents a respective one of the reference media streams, and where each reference media stream is broadcast on a respective channel. Further, at block 34, the method includes the computing system detecting, based on a comparison of the reference fingerprints with each other, that a plurality of the reference fingerprints match each other, the plurality of reference fingerprints thus defining a multi-match group.

At block 36, the method further includes the computing system determining that a query fingerprint representing a media stream (comprising video content and/or audio content) being rendered by a media presentation device matches the multi-match group. For instance, the computing system could determine that the query fingerprint matches a representative fingerprint of the multi-match group, or that the query fingerprint matches a reference fingerprint that is a member of the multi-match group. And at block 38, the method includes, responsive to the determining, the computing system using one or more attributes of the received query fingerprint as a basis to determine which reference fingerprint of the multi-match group best matches the query fingerprint and to determine that the channel on which the reference media stream represented by the determined reference fingerprint is broadcast is the channel on which the media stream being rendered by the media presentation device is being broadcast.

At block 40, the method then includes the computing system taking action based on the determined channel. For example, the computing system could cause supplemental channel-specific content to be presented by the media presentation device in conjunction with the media stream being rendered by the media presentation device, and/or the computing system could record presentation of the determined channel for use in a channel ratings system.

In line with the discussion above, in this process, the act of obtaining the reference fingerprints could involve receiving the reference fingerprints from media receiver devices, with the media receiver devices receiving the reference media streams on the channels and generating and providing the reference fingerprints representing the received reference media streams. Alternatively or additionally, the act of obtaining the reference fingerprints could include receiving the reference media streams and generating the reference fingerprints based on the received reference media streams.

Further in line with the discussion above, the computing system could be an entity other than the media presentation device, in which case the media presentation device could generate the query fingerprint and send the query fingerprint to the computing system, and the computing system could thus receive the query fingerprint from the media presentation device.

And additionally in line with the discussion above, the computing system could correlate each reference fingerprint with the channel on which the reference media stream represented by the reference fingerprint is broadcast, to facilitate determining, based on the determined reference fingerprint, the channel on which the reference media stream represented by the determined reference fingerprint is broadcast. For instance, the computing system could record in data storage, in association with each reference fingerprint, an indication of the channel on which the reference media stream represented by the reference fingerprint is broadcast. Thus, when the computing system determines the reference fingerprint that best matches the query fingerprint, the computing system could determine the channel on which the associated reference media stream is broadcast, and the computing system could conclude that that is the channel on which the media stream being rendered by the media presentation device is being broadcast.

Figure 4:
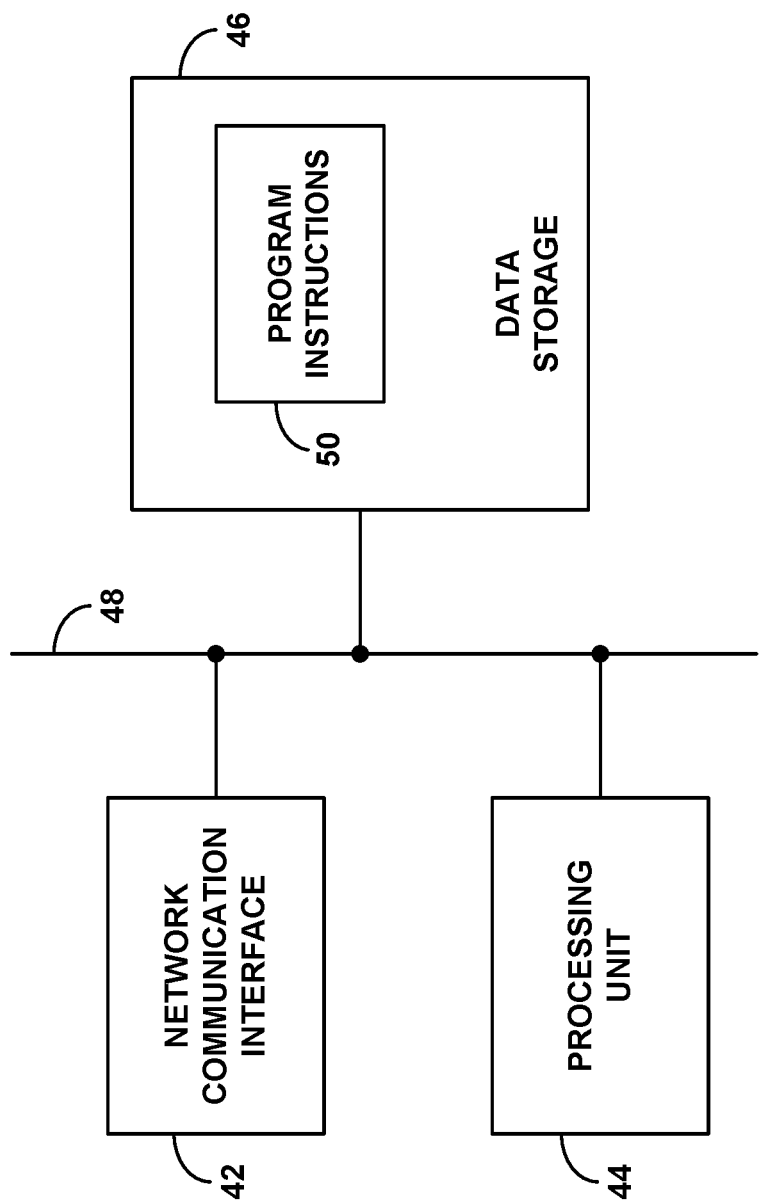
FIG. 4 is a simplified block diagram of an example network server.

FIG. 4 is next a simplified block diagram of an example system operable in accordance with the present disclosure. This system could represent a network server as described above, and/or one or more other entities (possibly including the media presentation device). As shown in FIG. 4, the example system includes a network communication interface 42, a processing unit 44, non-transitory data storage 46, any or all of which could be integrated together or, as shown, communicatively linked together by a system bus, network, or other connection mechanism 48.

Network communication interface 42 could comprise one or more physical network connection mechanisms to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 44, could then comprise one or more general purpose processors (e.g., microprocessors) and/or one or more specialized processors (e.g., application specific integrated circuits). And non-transitory data storage 46 could comprise one or more volatile and/or non-volatile storage components, such as optical, magnetic, or flash storage. As shown, non-transitory data storage 46 then stores program instructions 50, which could be executable by processing unit 44 to carry out various operations described herein. For example, the program instructions could be executable to carry out the operations described above in connection with FIG. 3.

In practice, features of the present disclosure could also be implemented in the form of a non-transitory computer readable medium having stored thereon program instructions executable by a processing unit to carry out various operations. In particular, the operations could include detecting, based on a comparison of reference fingerprints with each other, that a plurality of the reference fingerprints match each other, the plurality of reference fingerprints defining a multi-match group, where each reference fingerprint represents a respective reference media stream being received on a respective known channel.

Further, the operations could include determining that a query fingerprint representing a media stream being rendered by a media presentation device matches the multi-match group. And the operations could include, responsive to the determining, using one or more attributes of the query fingerprint as a basis to determine which one reference fingerprint of the multi-match group best matches the query fingerprint and to determine that the channel on which the determined reference stream represented by the determined reference fingerprint is being received is the channel carrying the media stream being rendered by the media presentation device. Further, the operations could then include taking action based on the determined channel. Various features described above could be implemented in this context as well.

Figure 5:
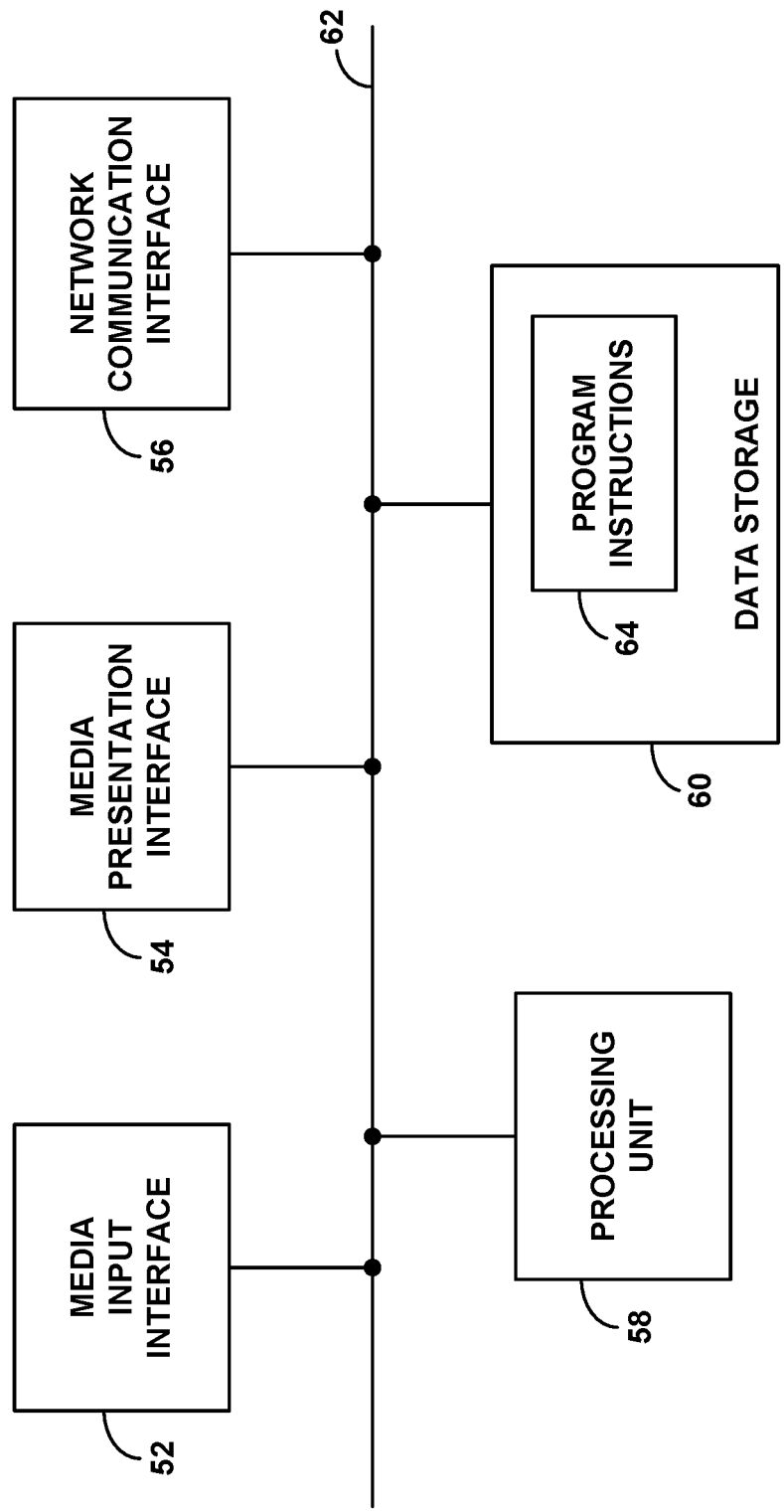
FIG. 5 is a simplified block diagram of an example media presentation device.

Finally, FIG. 5 is a simplified block diagram of an example media presentation device operable in accordance with the present disclosure. In line with the discussion above, this media presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 5, the example media presentation device includes a media input interface 52, a media presentation interface 54, a network communication interface 56, a processing unit 58, and non-transitory data storage 60, any or all of which could be integrated together or, as shown, communicatively linked together by a system bus, network, or other connection mechanism 62.

Media input interface 52 could comprise a physical communication interface for receiving media content to be presented by the media presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others.

Media presentation interface 54 could then comprise one or more components to facilitate presentation of the received media content. By way of example, the media presentation interface could comprise a user interface such as a display screen and/or a loudspeaker, as well as one or more drivers or other components for processing the received media content to facilitate presentation of the content on the user interface.

Network communication interface 56 could comprise a physical network connection mechanism to facilitate communication on a network such as network 22 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 58 could then comprise one or more general purpose processors (e.g., microprocessors) and/or one or more specialized processors (e.g., application specific integrated circuits). And non-transitory data storage 60 could comprise one or more volatile and/or non-volatile storage components, such as optical, magnetic, or flash storage. Further, as shown, data storage 60 stores program instructions 64, which could be executable by processing unit 58 to carry out various operations described here. For example, the program instructions could be executable to generate on an ongoing basis a fingerprint of a media stream being rendered by the media presentation device, based on analysis of the media stream being received at the media input interface 52 and/or being processed at the media presentation interface 54, and to provide the generated fingerprint on an ongoing basis to facilitate channel identification and action as described herein.

Exemplary embodiments have been described above. Those skilled in the art will understand, however, that changes and modifications may be made to these embodiments without departing from the true scope and spirit of the invention.

What is claimed is:

1. A method comprising:
    comparing by a computing system (i) a query fingerprint representing a media stream being rendered by a media presentation device with (ii) reference fingerprints each representing a respective reference media stream carried by a respective known channel of media content, wherein a group of the reference fingerprints are flagged as matching each other;
    determining by the computing system (i) based on the comparing, that the query fingerprint matches a given reference fingerprint and (ii) that the given reference fingerprint is a member of the group of reference fingerprints flagged as matching each other; and responsive to the determining that the query fingerprint matches the given reference fingerprint and that the given reference fingerprint is a member of the group of reference fingerprints flagged as matching each other, using by the computing system one or more attributes of the query fingerprint as a basis to determine which reference fingerprint of the group of reference fingerprints best matches the query fingerprint and to determine that the channel carrying the reference media stream represented by the determined reference fingerprint is the channel carrying the media stream being rendered by the media presentation device.

2. The method of claim 1, further comprising taking action by the computing system based on the determined channel.

3. The method of claim 2, wherein the media stream being rendered by the media presentation device represents media content, and wherein taking action based on the determined channel comprises replacing a portion of the media content with alternative media content.

4. The method of claim 3, wherein the alternative media content comprises a replacement advertisement.

5. The method of claim 2, wherein taking action based on the determined channel comprises causing supplemental channel-specific content to be presented by the media presentation device in conjunction with the media stream being rendered by the media presentation device.

6. The method of claim 2, wherein taking action based on the determined channel comprises recording presentation of the determined channel for use in a channel ratings system.

7. The method of claim 1, wherein the computing system is an entity other than the media presentation device, and wherein the query fingerprint is generated by the media presentation device, the method further comprising:
receiving by the computing system, from the media presentation device, the query fingerprint.

8. The method of claim 1, wherein the media stream being rendered by the media presentation device comprises content selected from the group consisting of video content and audio content.

9. A computing system comprising:
a network communication interface;
a processing unit;
non-transitory data storage; and
program instructions stored in the non-transitory data storage and executable by the processing unit to carry out operations including:
comparing (i) a query fingerprint representing a media stream being rendered by a media presentation device with (ii) reference fingerprints each representing a respective reference media stream carried by a respective known channel of media content, wherein a group of the reference fingerprints are flagged as matching each other,
determining (i) based on the comparing, that the query fingerprint matches a given reference fingerprint and (ii) that the given reference fingerprint is a member of the group of reference fingerprints flagged as matching each other, and
responsive to the determining that the query fingerprint matches the given reference fingerprint and that the given reference fingerprint is a member of the group of reference fingerprints flagged as matching each other, using one or more attributes of the query fingerprint as a basis to determine which reference fingerprint of the group of reference fingerprints best matches the query fingerprint and to determine that the channel carrying the reference media stream represented by the determined reference fingerprint is the channel carrying the media stream being rendered by the media presentation device.

10. The computing system of claim 9, wherein the operations additionally include taking action based on the determined channel.

11. The computing system of claim 10, wherein the media stream being rendered by the media presentation device represents media content, and wherein taking action based on the determined channel comprises causing a portion of the media content to be replaced with alternative media content.

12. The computing system of claim 11, wherein the alternative content comprises a replacement advertisement.

13. The computing system of claim 10, wherein taking action based on the determined channel comprises causing supplemental channel-specific content to be presented by the media presentation device in conjunction with the media stream being rendered by the media presentation device.

14. The computing system of claim 10, wherein taking action based on the determined channel comprises recording presentation of the determined channel for use in a channel ratings system.

15. The computing system of claim 9, wherein the computing system is an entity other than the media presentation device, wherein the query fingerprint is generated by the media presentation device, and wherein the operations further include:
receiving, via the network communication interface, from the media presentation device, the query fingerprint.

16. The computing system of claim 9, wherein the media stream being rendered by the media presentation device comprises video content.

17. A non-transitory computer-readable medium having stored thereon instructions executable by a processing unit to carry out operations comprising:
comparing (i) a query fingerprint representing a media stream being rendered by a media presentation device with (ii) reference fingerprints each representing a respective reference media stream carried by a respective known channel of media content, wherein a group of the reference fingerprints are flagged as matching each other;
determining (i) based on the comparing, that the query fingerprint matches a given reference fingerprint and (ii) that the given reference fingerprint is a member of the group of reference fingerprints flagged as matching each other; and
responsive to the determining that the query fingerprint matches the given reference fingerprint and that the given reference fingerprint is a member of the group of reference fingerprints flagged as matching each other, using one or more attributes of the query fingerprint as a basis to determine which reference fingerprint of the group of reference fingerprints best matches the query fingerprint and to determine that the channel carrying the reference media stream represented by the determined reference fingerprint is the channel carrying the media stream being rendered by the media presentation device.

18. The non-transitory computer readable medium of claim 17, wherein the operations additionally include taking action based on the determined channel.

19. The non-transitory computer readable medium of claim 18, wherein the media stream being rendered by the media presentation device represents media content, and wherein taking action based on the determined channel comprises causing a portion of the media content to be replaced with alternative media content.

20. The non-transitory computer readable medium of claim 18, wherein taking action based on the determined channel comprises recording presentation of the determined channel for use in a channel ratings system.

\* \* \* \* \*

UNITED STATES PATENT AND TRADEMARK OFFICE
CERTIFICATE OF CORRECTION

| | | |
|---|---|---|
| PATENT NO. | : 11,463,765 B2 | Page 1 of 1 |
| APPLICATION NO. | : 17/248352 | |
| DATED | : October 4, 2022 | |
| INVENTOR(S) | : Chung Won Seo et al. | |

It is certified that error appears in the above-identified patent and that said Letters Patent is hereby corrected as shown below:

In the Claims

Claim 12, Column 18, Lines 17-18 "wherein the alternative content" should read --wherein the alternative media content--.

Signed and Sealed this
Thirteenth Day of June, 2023

Katherine Kelly Vidal
*Director of the United States Patent and Trademark Office*